US006285748B1

(12) United States Patent
Lewis

(10) Patent No.: US 6,285,748 B1
(45) Date of Patent: Sep. 4, 2001

(54) NETWORK TRAFFIC CONTROLLER

(75) Inventor: David George Lewis, Freehold, NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 08/936,903

(22) Filed: Sep. 25, 1997

(51) Int. Cl.[7] .................................................. H04M 15/00
(52) U.S. Cl. ............................ 379/113; 379/111; 379/112; 379/114; 379/137; 370/229; 370/230; 370/232; 370/233
(58) Field of Search ...................................... 379/111, 112, 379/113, 114, 137, 138, 133, 134, 139, 93.01, 231, 234, 252, 253, 264, 265, 477, 487, 237, 239; 370/229, 230, 232, 233, 235, 236

(56) References Cited

U.S. PATENT DOCUMENTS

| | | | | |
|---|---|---|---|---|
| 4,531,208 | * | 7/1985 | Kaplan et al. ............................ | 370/7 |
| 5,488,655 | * | 1/1996 | Hamlen ................................. | 379/114 |
| 5,504,744 | * | 4/1996 | Adams et al. ......................... | 370/60.1 |
| 5,515,425 | * | 5/1996 | Penzias et al. ........................ | 379/114 |
| 5,530,724 | * | 6/1996 | Abrams et al. ....................... | 375/345 |
| 5,673,256 | * | 9/1997 | Maine ..................................... | 379/67 |
| 5,754,634 | * | 5/1998 | Kay et al. .............................. | 379/134 |
| 5,825,769 | * | 10/1998 | O'Reilly et al. ...................... | 379/112 |
| 5,848,139 | * | 12/1998 | Grover .................................. | 379/114 |
| 5,886,984 | * | 3/1999 | Abu-Amara et al. ................ | 370/252 |
| 5,896,445 | * | 4/1999 | Kay et al. ............................. | 379/113 |
| 5,898,668 | * | 4/1999 | Shaffer ................................. | 370/230 |
| 5,903,638 | * | 5/1999 | Welter, Jr. et al. .................. | 379/220 |
| 5,926,483 | * | 7/1999 | Javitt ..................................... | 370/477 |
| 6,011,838 | * | 1/2000 | Cox ..................................... | 379/112 |

* cited by examiner

Primary Examiner—Curtis Kuntz
Assistant Examiner—Rexford Barnie
(74) Attorney, Agent, or Firm—Oliff & Berridge, PLC

(57) ABSTRACT

A network traffic control system that generates traffic monitor information by monitoring the network traffic and controls the network traffic based on the traffic monitor information. The network traffic monitoring system includes a network traffic monitor and a network traffic controller. The network traffic monitor determines information such as types of communication, communicating partners, and geographical locations of the communicating partners. The network traffic controller processes the traffic monitor information. Thus, the traffic network control system reduces the cost of network communication as well as optimizes network performance based on traffic monitor information obtained by the traffic monitor.

14 Claims, 3 Drawing Sheets

NETWORK TRAFFIC CONTROLLER

BACKGROUND OF THE INVENTION

1. Field of Invention

This invention relates to network traffic monitoring and control.

2. Description of Related Art

Network traffic includes voice and voiceband data communications. Voice communications such as telephone conversations usually require a continuous connection. In contrast, voiceband data communications do not require a continuous connection because delays in data communications are easily tolerated. For example, sending facsimiles may tolerate short delays because the communication is not required to be continuous. However, conventional telephone networks handle both the voice and voiceband data communications similarly without taking advantage of the varying transmission requirements of the respective types of communication. Thus, there is a need for new technology to further optimize network traffic control to reduce cost of communications as well as improve communication services by taking advantage of different transmission requirements.

SUMMARY OF THE INVENTION

The invention provides a network traffic control system that generates traffic monitor information by monitoring and controlling the network traffic based on the traffic monitor information. The network traffic monitoring system includes a network traffic monitor and a network traffic controller. The network traffic monitor monitors all network traffic communications and generates the traffic monitor information by detecting, for each network traffic communication information such as types of each communication (i.e. voice or voiceband data), communicating partners, geographical locations of the communicating partners, etc. The traffic monitor information is sent to the network traffic controller which processes and stores the processed traffic monitor information in a database.

The network traffic controller controls the network traffic based on the processed traffic monitor information. For example, if two particular communicating parties participate in voiceband data communication during a specific period of time, the network traffic controller may pre-empt such communication during network congestion periods. The network traffic controller may also set a lower billing rate for voiceband data communication as compared to voice communication because voiceband data communication demands less stringent communication requirements. Thus, the traffic network controller reduces the cost of network communication as well as optimizes network performance based on traffic monitor information obtained by the traffic monitor.

BRIEF DESCRIPTION OF THE DRAWINGS

The invention is described in detail with reference to the following drawings wherein like numerals reference like elements, and wherein.

DETAILED DESCRIPTION OF PREFERRED EMBODIMENTS

Figure 1:
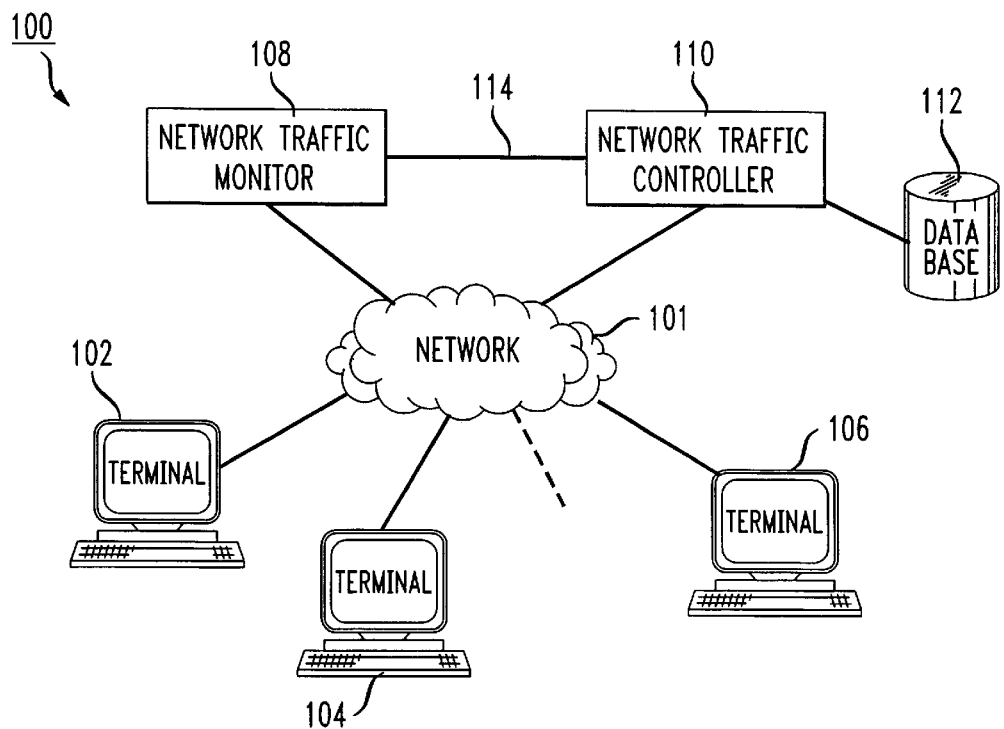
FIG. 1 is a block diagram of a network traffic system.

FIG. 1 shows a network traffic controller system 100 that includes a network 101 (e.g. telephone networks or data networks such as the Internet or a combination of both), terminals 102, 104, and 106, a network traffic monitor 108, a network traffic controller 110 and a database 112 coupled to the network traffic controller 110. The network traffic monitor 108 generates traffic monitor information by monitoring the traffic in the network 101 among terminals that are connected to the network 101 such as the terminals 102–106. For example, if the terminal 102 communicates with the terminal 106 in a telephone communication, the network traffic monitor 108 may non-intrusively detect that a telephone call between the terminals 102 and 106 is occurring and may record both a time of the telephone conversation, geographical locations of the terminals 102 and 106, and a duration of the communication.

The network traffic monitor 108 is connected to the network traffic controller 110. While FIG. 1 shows the network traffic monitor 108 and the network traffic controller 110 as discrete devices, both the network traffic monitor 108 and the network traffic controller 110 may be distributed throughout the network. The signal bus 114 connecting the network traffic monitor 108 and the network traffic controller 110 may be a control network so that multiple network traffic monitors 108 may communicate with multiple network traffic controllers 110 through the control network. Thus, in the following discussion, the network traffic monitor 108 and the network traffic controller 110 are referenced either in the singular or in the plural as the context requires.

The network traffic monitor 108 sends the traffic monitor information to the network traffic controller 110. The network traffic controller 110 stores the traffic monitor information in the database 112 and uses the traffic monitor information and current network status to control the traffic throughout the network 100 so that optimum performance may be obtained.

Figure 2:
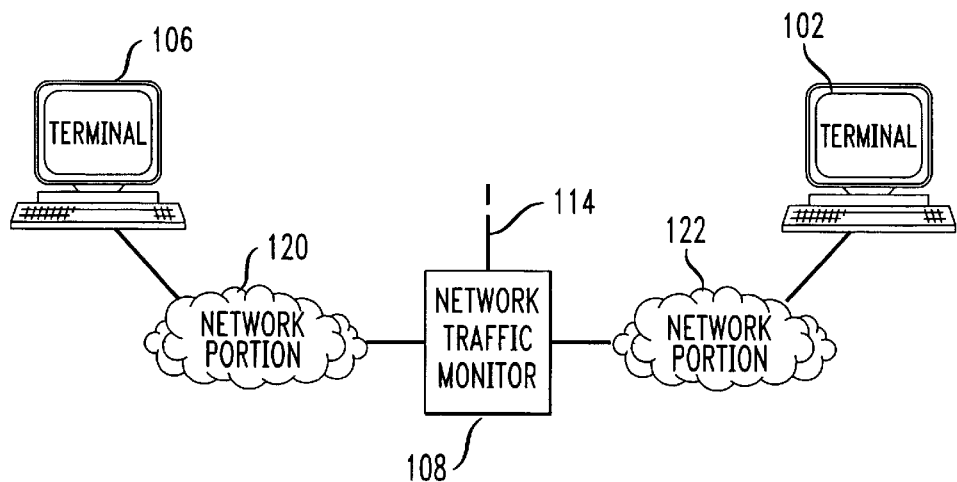
FIG. 2 is a block diagram of a network traffic monitor within a network.

The network traffic monitor 108 may monitor the network traffic at any point in the network as shown in FIG. 2. Various traffic monitoring techniques are known in the art such as disclosed in U.S. Pat. Nos. 4,979,211, 5,299,257, and 5,490,199 which are hereby incorporated by reference. These monitoring techniques are able to distinguish whether the communication signals are analog voice signals, digital voice signals or voiceband data signals such as facsimile transfers or other types of data transfers using various protocols such as CCITT V.29, V.32 or V.33.

As shown in FIG. 2, the network traffic monitor 108 may be placed between two network portions 120 and 122 that are part of a communication path between terminals 106 and 102. While the network traffic monitor 108 may be implemented by using expensive specialized equipment, an inexpensive implementation may be obtained by incorporating the network traffic monitor functions into already existing communication signal processing devices such as echo cancellation devices. Because echo cancellation devices are required to achieve transmission quality, these devices process substantially all communication signals that traverse the network 101. Thus, incorporating the network traffic monitor functions in devices such as the echo cancellation devices reduces the cost of implementing network monitoring.

The network portion 120 may include a switch located within a local exchange carrier, for example. In this case, the controller of the switch may serve as a network traffic controller 110 controlling the communication traffic from the terminal 106 to the other terminals 102 and 104 connected to the network 101.

Figure 3:
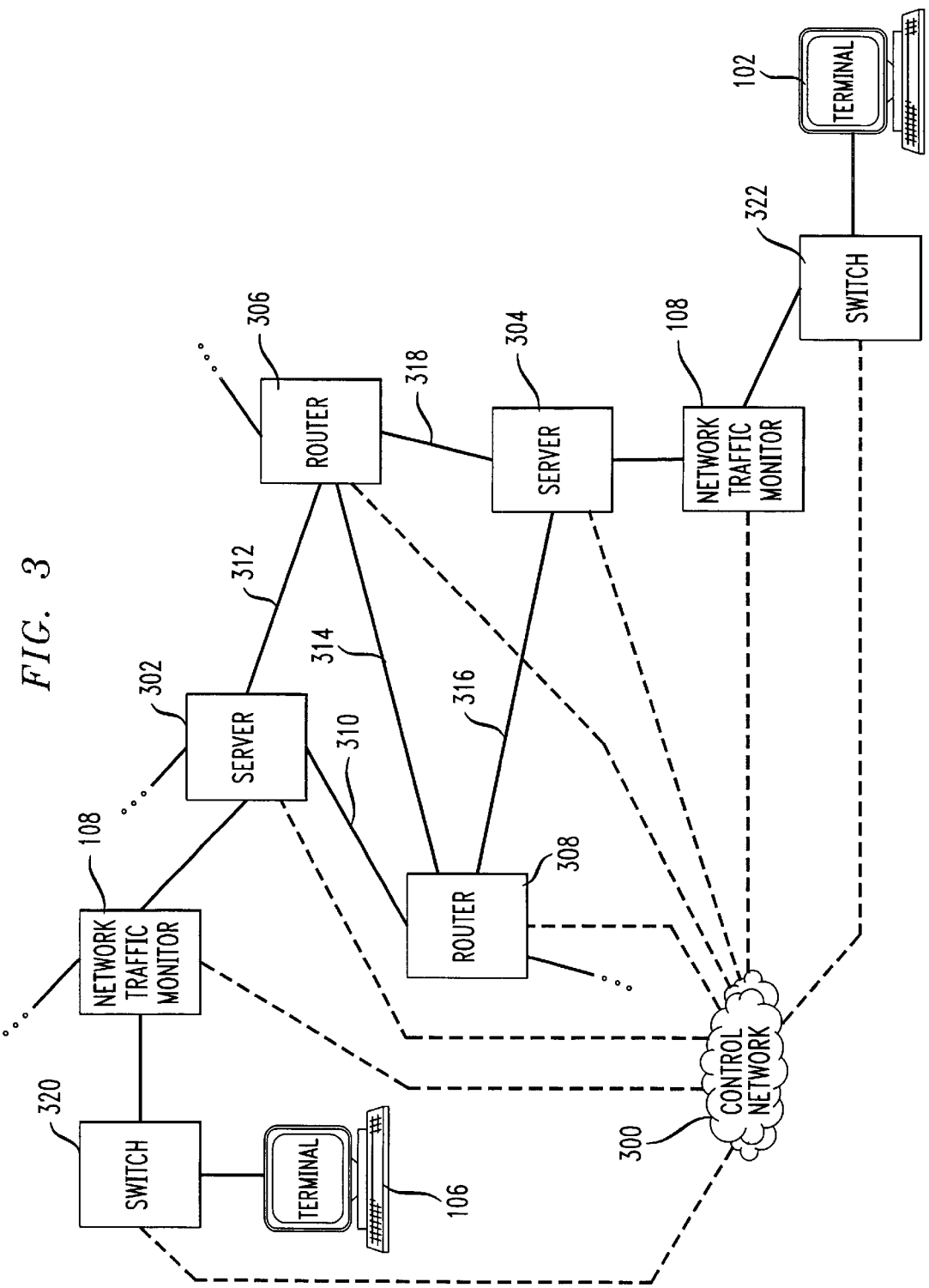
FIG. 3 is a block diagram of an example network portion.

As shown in FIG. 3, the terminal 106 is connected to switch 320 which in turn is connected to server 302 through a first network traffic monitor 108. In this example, the switch 320 is the network portion 120 and is connected to the network 101 through the first network traffic monitor 108. The servers 302 and 304, the routers 306 and 308, and the switch 322 form the network portion 122 that connects to the terminal 102. A second network traffic monitor 108 monitors the communications of the terminal 102 and the switch 322 is connected to the second network traffic monitor 108 and performs network traffic controller functions relative to the terminal 102.

The servers 302–304, routers 306–308, and switches 320–322 all may function as network traffic controllers 110 and be coupled together through a control network 300. The network traffic monitors 108 are also coupled to the control network 300 so that the traffic monitor information is available to the network controllers 302–308, 320 and 322. While FIG. 3 shows the control network 300 as a separate network, the physical structure may be the same as the physical structure for the network 101 (e.g. servers 302 and 304; routers 306 and 308 and the interconnecting communication links).

Figure 4:
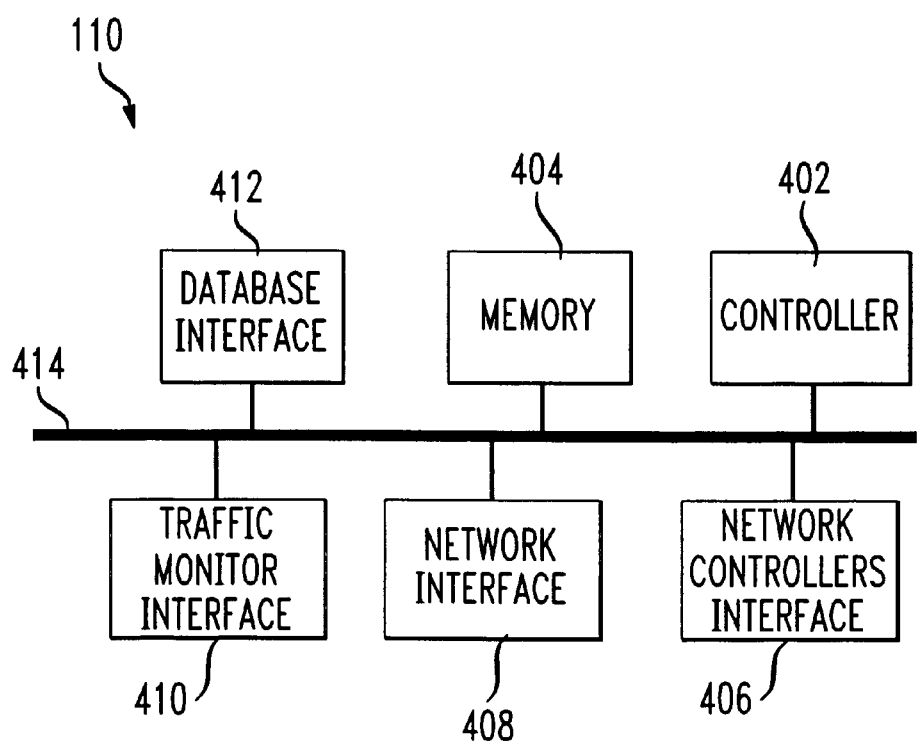
FIG. 4 is a block diagram of a network traffic controller.

FIG. 4 shows a block diagram of the network traffic controller 110. The network traffic controller 110 includes a controller 402, a memory 404, a traffic monitor interface 410, a network interface 408, a network controller interface 406 and a database interface 412. The above components are coupled together through signal bus 414.

As discussed earlier, the control network 300 may use the same physical transmission paths as the network 101 and thus the network controller interface 406 and the network interface 408 may be the same physical unit but performing different logical functions. Also, the database interface 412 interfaces with the database 112. However, the database 112 may be part of the memory 404 and thus the database interface 412 may be incorporated into the functions of the controller 402. For the following discussion, it is assumed that the database 112 is a separate database and the controller 402 interfaces with the database 112 through the database 412. Also, the control network 300 is assumed to be separate from the network 100 and thus the network controller interface 406 is separate from the network interface 408.

The controller 402 receives the traffic monitor information through the traffic monitor interface 410 and stores the traffic monitor information in the database 112 through the database interface 412 in a suitable format. The traffic monitor information is processed and compiled in the database 112 so that communication trends may be detected for all the terminals 102, 104, and 106 connected to the network 101. Based on the historical communication trends, optimal network resource allocation may be accomplished by distributing analysis results of the traffic monitor information to all of the controllers 302–308, 320 and 322 of the network 101 through the network controller interface 406.

The switches 320 and 322 receive the traffic monitor information from the first and the second network traffic monitors 108 and use the traffic monitor information to process communications from the terminals such as the terminals 102 and 106 to provide differential treatment based on the type of communication being made. For example, the charges for a voice conversation may be different than for facsimile transmission, e-mail, ISDN-data or for other voiceband data communications. In addition, during network congestion, various communications may be handled differently. For example, facsimile communications may be pre-empted temporarily by voice conversation communications because facsimile communications may tolerate greater delays.

TABLE 1

| | 8 am–11 am | 11 am–1 pm | 1 pm–5 pm | 5 pm–7 pm | 7 pm–12 am | 12 am–8 am |
|---|---|---|---|---|---|---|
| From Terminal 102 | | | | | | |
| To Terminal 104 | | 20% Fax | 90% Modem | | | |
| Terminal 106 | 10% Voice | | | | | |
| Terminal 108 | | | | | | |
| From Terminal 104 | | | | | | |
| To Terminal 102 | 90% Fax | 90% Fax | 90% Fax | 90% Fax | 90% Fax | 90% Fax |
| Terminal 106 | 90% Fax | 90% Fax | 90% Fax | 90% Fax | 90% Fax | 90% Fax |
| From Terminal 108 | | | | | | |
| To Terminal 102 | 90% Voice | | 20% Modem | | | |
| Terminal 106 | | 90% Voice | 60% Voice | 30% ISDN-data | | |

Table 1 shows, as an example, a possible analysis of communications made among the terminals 102, 104, 106 and 108. The terminals 102, 104 and 108 are used for three different purposes. The terminal 102 serves a small business owned by a first partner and a second partner where a single telephone line is connected to three devices such as a telephone, a facsimile machine, and a modem of a personal computer. The terminal 104 is a facsimile machine connected to a dedicated line of a large supplier corporation that provides services and/or supplies to the small business. The terminal 108 represents devices located in a residence of one of the partners of the small business. Thus, the terminal 108 may be a telephone station and a personal computer having a modem and an ISDN terminal adapter connected to the same telephone line.

A scenario may be as follows: the first partner of the small business using the terminal 102 calls a customer at the terminal 106 during the morning hours (8:00 am–11:00 am) to negotiate orders. Then, between 11:00 a.m. and 1:00 p.m. the orders are sent to the supplier's terminal 104. Between 1:00 p.m. and 5:00 p.m., the first partner transfers business transactions that occurred during the morning and early afternoon hours to the home computer of the second partner through modems of respective computers.

Table 1 shows a matrix of statistical values corresponding to the communications of each of the terminals 102–108 for six pre-defined time periods. The time periods are indicated above each of the columns starting with the second column. The left-most column is divided into three portions. Each of the portions corresponds to a first communicating "from" terminal and the rows of each portion corresponds to second communicating "to" terminals. For example, a first portion corresponds to "from" terminal 102. The three rows in the first portion corresponds to the second communicating "to" terminals 104, 106 and 108. The second portion corresponds to "from" terminal 104 and contains two rows corresponding to "to" terminals 102 and 106. The third portion corresponds to "from" terminal 108 and contains two rows corresponding to "to" terminals 102 and 106.

For each of the second communicating terminals, percentage values of the type of communications made from each of the first communicating terminals are recorded. For example, from 8:00 a.m. to 11:00 p.m., ten percent of communications made by terminal 102 to terminal 106 are voice conversation communications. From 11:00 a.m. to 1:00 p.m., 20% of the communications made from terminal 102 to terminal 104 are facsimile (fax) communications. From 1:00 p.m. to 5:00 p.m., 90% of the communications from the terminal 102 to the terminal 108 are modem communications, for example.

For the terminal 104, because this is a facsimile machine, 90% of all the communications made to the terminal 102 and the terminal 106 are facsimile communications. Once in a while, employees of the corporation pick up the facsimile telephone receiver and make personal calls resulting in only 90% of the total number of communications being facsimile communications. Based on the information shown in Table 1, the network traffic controller 110 may set predetermined sets of criteria such as thresholds so that when a particular type of communication exceeds a threshold (i.e., 30%) special processing may be applied in real time (i.e. on the fly) during the relevant periods of the day.

For example, communications made from the terminal 104 are almost always facsimiles. Thus, the network traffic controller 110 may set communication processing parameters for new communications from the terminal 104 appropriate for facsimiles. In contrast, communications made from the terminal 108 during the morning hours are 90% voice conversations. Thus, the network traffic controller 110 may set communication processing parameters for new communications from the terminal 108 during the morning hours that are appropriate for voice conversations.

TABLE 2

|  | ISDN-Data | Facsimile | Modem | Voice | Multimedia |
|---|---|---|---|---|---|
| Specialized Processing | No Compression No Echo Cancellation | No Compression | Compression | Compression Voice Processing | Compression Voice Process Image Process |
| Latency | High | High | Moderate | Low | High-Voice Medium-Image |

Table 2 shows exemplary options for communication processing parameters available to the network traffic controllers 110 depending on the types of communications made. For example, facsimile communications may not be compressed because the data transmitted are already compressed by transmitting terminals 102–108. However, modem communications, voice and multi-media communications are susceptible to various compression techniques. The appropriate compression processing may be applied as a default to communications of a specific type during periods of high usage.

For example, the terminal 108 from 8:00 a.m. and 1:00 p.m. may receive special voice processing such as time assignment speech interpolation or low bit rate voice encoding. Also, if multimedia communication is detected to occur a large percentage of time during a particular period, special image data processing may be applied as a default during the relevant period.

Table 2 also indicates that data transfer latency could be high for ISDN-data and facsimile communications, moderate for modem communications and low for voice and multimedia transfers. Thus, based on the information from Table 1, different network traffic routing and pre-emption processing may be applied to new and on-going communications from the terminals 102, 104 and 108 to both reduce the cost of system usage as well as directing system resources to their best use, thus optimizing the system performance.

TABLE 3

|  | ISDN-Data | Facsimile | Modem | Voice | Multimedia |
|---|---|---|---|---|---|
| Rate | High | Low | Medium | High | High |
| Priority | Medium | Low | Medium | High | High-Voice Medium-Image |

Table 3 shows an example of billing processing parameters that the network traffic controller 110 may apply depending on the type of communications that are made. Table 3 has two rows and five columns. The second row indicates the charging rate for the communication and the third row indicates the priority of the communication. The five columns correspond to ISDN-data, facsimile, modem, voice and multimedia communications. Based on Table 3, facsimiles may be charged at a low rate because facsimiles tolerate communication delays. Modem communications are charged a medium rate because while some delays may be tolerated, interactive data communication usually requires response times in the range of seconds. Voice and multimedia communications are charged at the highest rate because these communications require continuous connections. ISDN-data also require a high rate because of the required line quality and speed.

Because the priority of facsimile communications are low, when adverse current network conditions occur such as network congestion or network failure, the data for these communications may be temporarily stored and transmitted at a later time when either the congestion or the failure conditions are resolved. However, ISDN-data, modem, voice and multimedia communications may not be so delayed. Thus, when network failure occurs, for example, these communications must be rerouted through other available communication paths so that the effects of network congestion/failure is not reflected to the users of the network. Based on the information of Table 1, the network traffic controller 110 may apply appropriate communication processing parameters as indicated in Table 3 as default options for the terminals 102, 104 and 108 during the relevant periods of use.

While this invention has been described in conjunction with specific embodiments thereof, it is evident that many alternatives, modifications and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A method for operating a network traffic controller system, comprising:

detecting a network communication;

detecting data related to the network communication wherein the data includes at least one of identifing a first and a second communicating party and corresponding geographical locations of the first and the second communicating party a duration of the network communication, and a time of the network communication;

sending the data related to the network communication as traffic monitor information to the network traffic controller;

processing the traffic monitor information, wherein the processing the traffic monitor information, includes generating time periods corresponding to a communication between a first party and a second party;

associating the corresponding geographical location with each of the first party and the second party; and analyzing percentages of network communication of the communications between the first party and the second party, the time periods and the corresponding geographical locations based on predetermined criteria to generate processed traffic monitor information; and processing the network traffic based on the traffic monitor information.

2. The method of claim 1, wherein the processing the network traffic, further comprises at least one of:

pre-empting a first network communication in favor of a second network communication during specified network traffic conditions; selecting a billing rate for the network communication based on the traffic monitor information and the processed traffic monitor information; and selecting communication processing for the network communication based on the traffic monitor information and the processed traffic monitor information.

3. The method of claim 2, wherein the first network communication and the second network communication include voiceband data communication or voice communication.

4. The method of claim 3, wherein the voiceband data communication includes ISDN-data communication, e-mail communication, facsimile communication, and modem communication.

5. The method of claim 2, wherein the billing rate for voiceband data communication is either lower or higher than for voice communication.

6. The method of claim 2, wherein the selecting communication processing step selects default processing for the network communication based on the traffic monitor information.

7. The method of claim 6, wherein the default processing includes at least one of data compression, no data compression, time assignment speech interpolation for voice communication, low bit rate voice encoding for voice communication and image data processing for video communication.

8. A network traffic controller system, comprising:

a network;

a network traffic monitor that detects a network communication and data related to the network communication wherein the data constitutes traffic monitor information that includes at least one of identifying a first and a second communicating party a corresponding geographical location of the first and the second communicating party a duration of the network communication, and a time of the network communication; and a network traffic controller, coupled to the network and the network traffic monitor, that processes the network traffic based on the traffic monitor information and that generates processed traffic monitor information based on a predetermined set of criteria, wherein the processed traffic information includes percentages of network communication of the communications between the first and the second communicating party;

time periods corresponding to a communication between a first party and a second party:

a corresponding geographical location with each of the first party and the second party.

9. The system of claim 8, wherein the network traffic controller based on the traffic monitor information processes the network traffic, wherein processing the network traffic, includes at least one of preempting a first network communication in favor of a second network communication during specified network traffic conditions, selecting a billing rate for a network communication based on the traffic monitor information and the processed traffic monitor information, and selecting communication processing for a network communication based on the traffic monitor information and the processed traffic monitor information.

10. The system of claim 9, wherein the first network communication and the second network communication include voiceband data communication or voice communication.

11. The system of claim 10, wherein the voiceband data communication includes ISDN-data communication, e-mail communication, facsimile communication, and modem communication.

12. The system of claim 9, wherein the billing rate for the voiceband data communication is either lower or higher than for the voice communication.

13. The system of claim 9, wherein the network traffic controller selects default processing for the network communication based on the processed traffic monitor information.

14. The system of claim 12, wherein the default processing includes at least one of data compression, no data compression, time assignment speech interpolation for voice communication, low bit rate voice encoding for voice communication and image data processing for video communication.

* * * * *

UNITED STATES PATENT AND TRADEMARK OFFICE
CERTIFICATE OF CORRECTION

| | | |
|---|---|---|
| PATENT NO. | : 6,285,748 B1 | Page 1 of 1 |
| APPLICATION NO. | : 08/936903 | |
| DATED | : September 4, 2001 | |
| INVENTOR(S) | : Lewis | |

It is certified that error appears in the above-identified patent and that said Letters Patent is hereby corrected as shown below:

Title Page, Item (56), under "U.S. PATENT DOCUMENTS",
insert -- 4,815,127 March 21, 1989 Sato et al. 379/417
4,979,211 December 18, 1990 Benvenuto et al. 381/43
5,299,257 March 29, 1994 Fuller et al. 379/100
5,490,199 February 6, 1996 Fuller et al. 379/1
5,557,747 September 17, 1996 Rogers et al. 395/200.11 --, therefor.

In Column 1, Line 61, delete "portion;" and insert -- portion; and --, therefor.

In Column 1, Line 62, delete "controller;" and insert -- controller. --, therefor.

In Column 6, Line 61, in Claim 1, delete "communication" and insert -- communication, --, therefor.

In Column 6, Line 62, in Claim 1, delete "identifing" and insert -- identifying --, therefor.

In Column 6, Line 65, in Claim 1, delete "party" and insert -- party, --, therefor.

In Column 7, Line 5, in Claim 1, delete "includes" and insert -- includes: --, therefor.

In Column 7, Line 45, in Claim 7, delete "processing" and insert -- processing, --, therefor.

In Column 7, Line 54, in Claim 8, delete "communication" and insert -- communication, --, therefor.

In Column 8, Line 3, in Claim 8, delete "party" and insert -- party, --, therefor.

In Column 8, Line 5, in Claim 8, delete "party" and insert -- party, --, therefor.

In Column 8, Line 13, in Claim 8, delete "includes" and insert -- includes: --, therefor.

In Column 8, Line 18, in Claim 8, delete "party:" and insert -- party; --, therefor.

In Column 8, Line 24, in Claim 9, delete "preempting" and insert -- pre-empting --, therefor.

Signed and Sealed this
Thirtieth Day of October, 2012

David J. Kappos
*Director of the United States Patent and Trademark Office*